Sept. 19, 1950
L. STILES
2,522,847
ICING MACHINE
Filed May 28, 1946
3 Sheets-Sheet 3
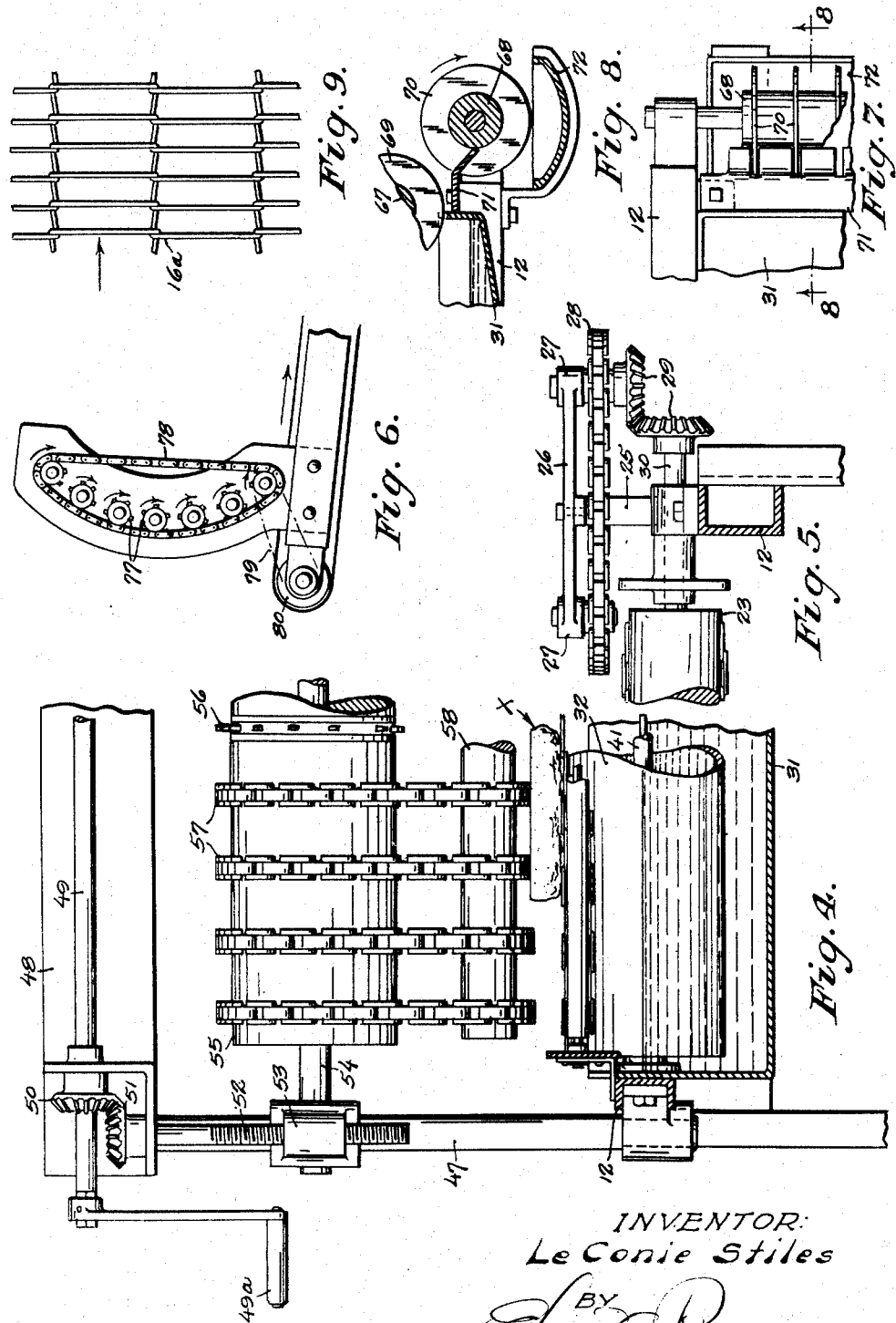
INVENTOR:
Le Conie Stiles
BY
ATTORNEY.

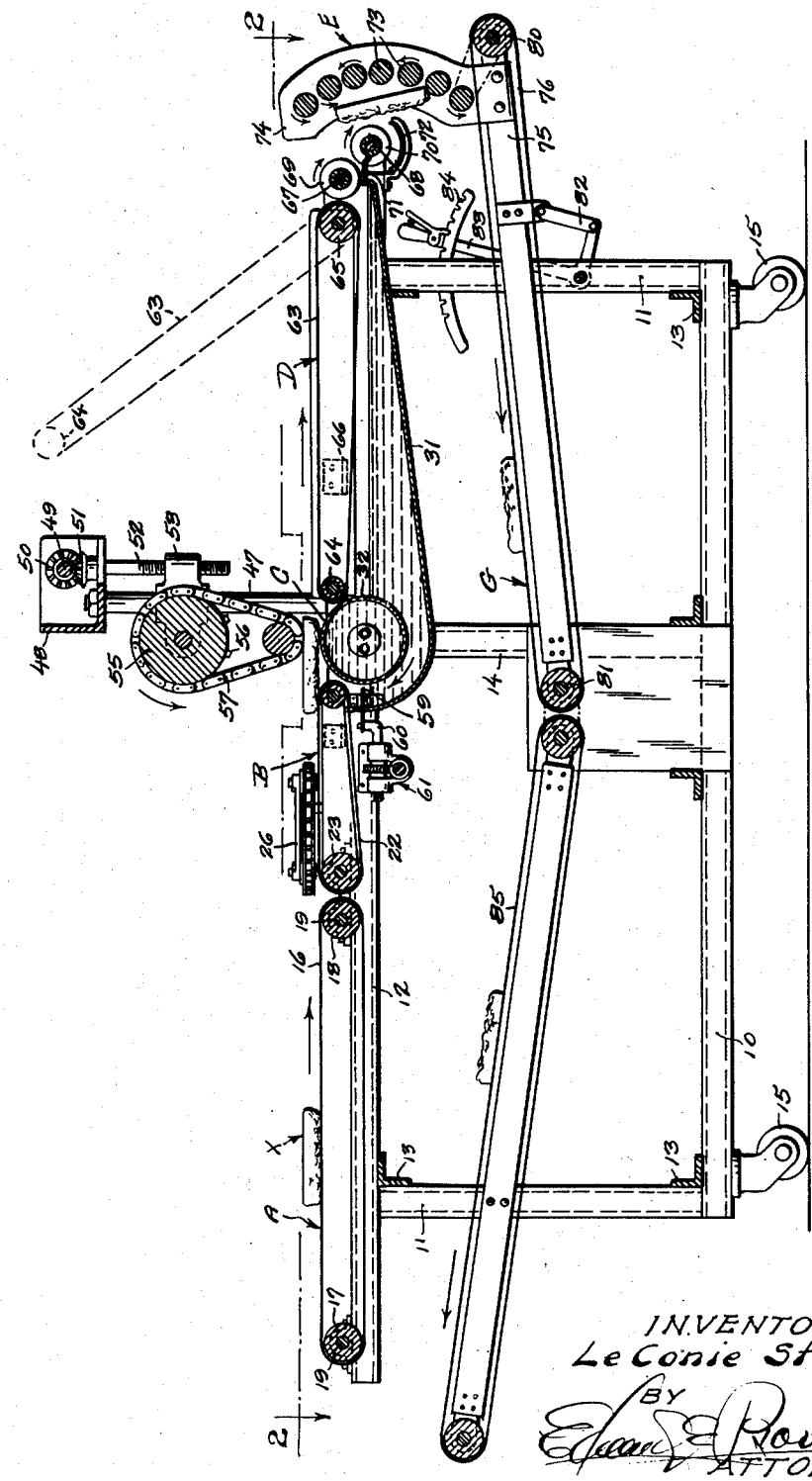

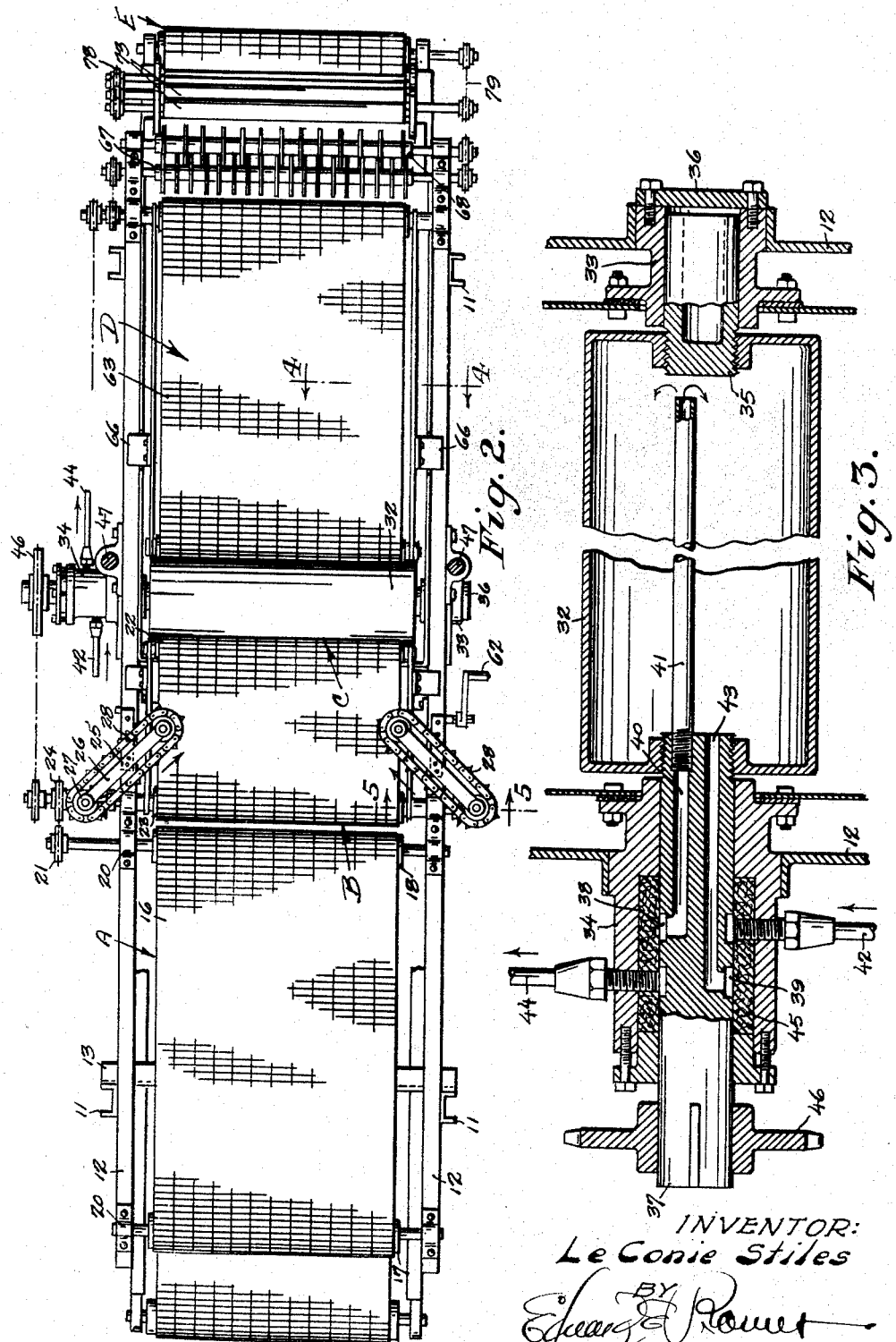

Patented Sept. 19, 1950

2,522,847

UNITED STATES PATENT OFFICE 2,522,847

ICING MACHINE

LeConie Stiles, Seattle, Wash.

Application May 28, 1946, Serial No. 672,847

9 Claims. (Cl. 91—2)

This invention relates to certain new and useful improvements in machines for icing cakes.

The primary object of the invention is to provide a machine for icing cakes in which the machine is preferably of a portable character and embodies a series of conveyors for the cakes to be iced such as what is known in the trade as "coffee cakes" and includes mechanism for the centering of the cakes relative to the conveying devices for correctly positioning the cakes for the application of icing thereto.

A further object of the invention is to provide a machine for icing coffee cakes wherein the cakes that pass over an icing drum are held in intimate contact therewith for the proper application of icing thereto.

It is a further and important object of the invention to provide an icing machine for coffee cakes and the like wherein a drum is employed for applying icing to the undersides of coffee cakes passing thereover with the drum dipping into an icing receptacle or pan and with steam heating means associated with the drum for maintaining the icing in the pan or receptacle in a semi-fluid or plastic condition.

A still further object of the invention is to provide a cake icing machine of the foregoing character that employs a rotatable drum for the application of icing to the cakes with adjustable means associated with the drum for controlling the thickness of icing thereon that is carried to the cakes being iced.

A still further object of the invention is to provide a machine for icing coffee cakes wherein the coffee cakes pass over a series of conveyors and an icing drum while in inverted condition with the icing applied to the lower sides of the cakes and with means for placing the coffee cakes in upright position after passage through the machine and being substantially dried, with the iced cakes delivered from the machine in upright condition.

With the above and other objects in view that will become apparent as the nature of the invention is better understood, the same consists in the novel form, combination and arrangement of parts hereinafter more fully described, shown in the accompanying drawings, and claimed.

In the drawings:

Figure 1 is a vertical longitudinal sectional view taken centrally of the machine showing coffee cakes traveling therethrough on endless conveyors, passing over the icing drum and in contact with the position reversing or turning over devices, the drying conveyor following the icing drum being shown by dotted lines in hinged elevated position permitting access to the icing receptacle for refilling, cleaning and the like, Figure 2 is a horizontal sectional view taken on line 2—2 of Figure 1 and illustrates the centering devices for the cakes associated with the conveyor next preceding the icing drum, Figure 3 is a longitudinal sectional view of the icing drum and associated removable end bearings with one of the bearings fashioned for the flow of a heating medium to and from the drum for maintaining the icing in the receptacle in a semi-fluent or plastic condition, Figure 4 is an enlarged fragmentary elevational view, partly in section, showing the vertically adjustable weighted holddown device for maintaining contact between the cakes and the icing drum, Figure 5 is a detail sectional view taken on line 5—5 of Figure 2, showing the centering chains for the cakes in placing them in proper position for icing on the conveyor section next preceding the icing drum, Figure 6 is a fragmentary elevational view of the bank or stand of rollers and the operating devices therefor for turning over the iced cakes into upright positions for placement onto the delivery conveyors, Figure 7 is a fragmentary plan view of the rollers at the delivery end of the drying conveyor for directing the cakes into engagement with the position reversing rollers for the cakes, Figure 8 is a cross-sectional view taken on line 8—8 of Figure 7, showing the disk rollers illustrated in Figure 7 and the scraper devices associated with the lower roller for removing excess icing therefrom, and Figure 9 is a fragmentary plan view of one of the cake conveyors, illustrated as being of wire mesh construction.

Briefly described, the cake icing machine disclosed in this application while being capable of applying icing to cakes of various types, the machine was especially designed for the icing of coffee cakes and in the description of the machine only "cakes" will be referred to. The machine is preferably of the portable type and is of general rectangular formation in plan view as illustrated in Figure 2, the frame of the machine comprising base rails 10 and upright corner legs 11 supporting side head rails 12 at their upper ends, the side portions of the frame being braced and connected by cross angle irons 13. Center legs 14 extend between base and head rails 10 and 12 while the frame is supported on casters 15.

The cake icing mechanism and the conveying devices for the cakes are arranged at the upper end of the frame while the return conveyors for the iced cakes are preferably arranged intermediate the upper and lower ends of the frame, and such conveying devices travel in chosen directions so that cakes to be iced are fed to the machine at one end and are delivered in iced condition from the same end of the machine. The conveying and icing devices for the cakes include a feed conveyor A that delivers the cakes to a centering conveyor B and from said centering conveyor the cakes are delivered to an icing drum and associated icing receptacle C and thereafter pass onto a drying conveyor D. From the drying conveyor D the iced cakes are delivered to the cake-positioning reversing mechanism E and from there are delivered to return or delivery conveyors G in an upright condition with the iced surface of the cake presented upwardly.

As shown more clearly in Figures 1 and 2, the feed conveyor A comprises an endless belt 16 that may be of any type desired, but preferably as illustrated in Figure 9 as being formed of a wire mesh 16ª, and said endless belt passes over guide rollers 17 and 18 carried by shafts 19 that are journaled at opposite ends in bearings 20 on the head rails 12, the shaft 19 for the guide roller 18 being extended and having a chain driven sprocket 21 thereon as illustrated. The cakes to be iced are first dumped from a pan, upside down onto the conveyor 16, and the cakes designated by the reference character X are illustrated as widely separated to clear the mechanism. Usually at least four cakes are dumped from a single pan onto the conveyor 16 and at random and these cakes are then delivered to the centering conveyor B.

As illustrated in Figures 1, 2, and 5, the centering conveyor B includes an endless belt 22 of the same general type as the belt 16, with the belt passing over guide rollers 23 with the upper run thereof in the plane of the upper run of the conveyor belt 16. The rollers 23 have bearing supports on the frame similar to the bearings 20 and one of the rollers has a sprocket chain driven wheel 24 thereon for the operation of the conveyor 22. A post 25 rises from each head rail 12 and supports at its upper end a cross arm 26 with a bearing 27 at each end of the cross arm for a sprocket wheel over which an endless chain passes, the cross arm 26 being so angled with respect to the length of the head rail 12 as to present corresponding ends of the endless chains 28 in overlapping relation to the endless conveyor 22 at opposite sides thereof. The operating means for the endless chains 28 include meshing gears 29, one of which is mounted on the shaft 30 that carries the adjacent belt roller 23 as illustrated in Figure 5. From an inspection of Figure 2 it will be observed that the endless chain 28 driven in the direction as indicated by arrow lines at opposite sides of the machine will position and aline the cakes centrally of the conveyor 22 and present the cakes inwardly of the opposite ends of the receiving icing drum and associated mechanism C.

The icing drum, icing receptacle and drying conveyor D are all closely related and the icing receptacle will be first described. As illustrated in Figure 1, the icing receptacle or pan 31 has an inclined bottom wall with the deeper end terminating slightly inwardly of the delivery end of the centering conveyor 22, the icing receptacle being suitably supported at the upper end of the machine frame. The icing drum is shown more clearly in Figures 1 and 3 and includes a hollow drum 32 mounted at its ends in bearings 33 and 34 preferably supported on the head rails 12, the end of the drum adjacent the bearing 33 having an internally threaded axial opening therein for the reception of a removable screw plug 35 carried in the bearing 33 and capable of displacement from the drum by removal of the end plate 36 of said bearing 33. The bearing 34 for the opposite end of the drum houses a rotatable shaft 37, the inner end of which has removable threaded engagement with an internally threaded central opening in the adjacent end of the drum 32. Upon removal of the screw plug 35 and shaft 37 from opposite ends of the drum, the latter may be removed for interiorly cleaning the same of any rust, incrustations, or other foreign deposits that would deter the heat transfer characteristic of the drum. As illustrated in Figure 1, the drum 32 dips into the icing in the deeper end of the icing receptacle 31 and a heating medium is supplied interiorly of the drum for maintaining the icing in the receptacle in a semifluent or plastic condition. Again, as shown in Figure 3, the rotatable shaft 37 has two spaced non-communicating annular channels 38 and 39 therein, the channel 38 communicating with a longitudinal bore 40 in the shaft 37 that enters the adjacent bearing end of the drum 32 and threadably receives one end of an elongated tube 41 that has its other open end terminating adjacent the other end of the drum. Steam, hot water, or other heating medium from a source of supply is delivered by the pipe 42 to the channel 38 and bore 40 for passage through the tube 41 as illustrated by arrow lines to the interior of the drum 32 substantially axially thereof. The outlet for the steam or other heating medium from the icing drum 32 is by way of the second bore 43 in the shaft 37, channel 39 and outlet pipe 44 entering the bearing 34 and communicating with said channel 39. A glandular packing 45 is interposed between the shaft 37 and bearing 34 to prevent the escape of the heating medium. As illustrated a chain driven sprocket 46 is mounted on the extended end of the shaft 37 for rotating the latter and the icing drum 32 attached thereto.

The cakes X having been placed on the conveyor devices upside down have their ultimate upper faces passed over the icing drum 32 for the application of icing thereto and holddown devices are provided for maintaining proper engagement of the cakes with the icing drum as illustrated in Figures 1 and 4. A post 47 rises from each head rail 12 in proximity of the bearings 33 and 34 and are connected at their upper ends by a cross head 48. A shaft 49 is journaled longitudinally of the head 48 and carries at each end thereof a bevel gear 50 that meshes with a bevel gear 51 carried by the upper end of a screw shaft 52 fitted in the cross head 48 and engageable at its lower end in a screw block 53. A shaft 54 is rotatably supported at its opposite ends in the screw blocks 53 and carries a drum 55 upon which spaced sets of sprocket teeth 56 are formed to be traversed by loosely depending sprocket chains 57 that support within their lower end loops a weighted roller 58. As shown in Figures 1 and 4, the lower runs or looped portions of the sprocket chains 57 contact the cakes X and operate to feed the cakes over the icing drum 32.

To control the depth or thickness of icing delivered by the drum 32 to the cakes X, there is provided a scraper bar 59 horizontally moving through the deeper end of the icing receptacle 31 into proximity of the icing drum 32 and this scraper bar or blade is controlled in its position with respect to the peripheral surface of said drum by its engagement with hook members 60 that are shiftable through the medium of worm and gear devices 61 supported on the head rail 12 as illustrated in Figure 1 and operated by the crank 62 shown in Figure 2. Reverting to the holddown devices for the cakes as illustrated in Figure 4, it is to be noted that upon rotation of the shaft 49 by the crank 49a at one end thereof that the screw rods 52 are adjusted for raising and lowering the screw blocks 53 to accommodate the cakes of various thicknesses.

The drying conveyor D is of the endless type and embodies an endless belt 63 of the type shown at 16a in Figure 9 and the speed of movement of the endless belt 63 is such that the icing on the cakes delivered thereto from the icing drum is substantially dry when passed onto the inverting devices. The endless belt 63 is mounted on rollers 64 and 65 supported on the head rails of the machine and said conveyor 63 is adapted to be moved on the bearing ends of the roller 65 to the dotted line position shown in Figure 1 to permit access to the icing pan 31 for the replenishing of fresh icing and cleaning of the receptacle. The free swinging end of the drying conveyor 63 is supported in its operative position by the lugs 66 extending from opposite sides thereof as shown in Figure 2 for engagement with the head rails 12.

The iced cakes with the icing on the lower faces thereof then pass over a pair of delivery or guide rollers 67 and 68 relatively arranged as illustrated in Figure 1 and each roller includes a plurality of spaced disks 69 and 70 to present a minimum of contact with the iced sides of the cake. As shown more clearly in Figures 7 and 8 a notched scraper blade 71 extends from the adjacent end of the icing receptacle 31 with the disks 70 passing through the notches of the blade 71 for the removal of any icing adhering thereto which is dropped into the drip pan 72.

The cakes are delivered from the guide rollers 67 and 68 to the reversing mechanism E which comprises an arcuate bank of rollers 73 journaled at their ends in upstanding arms 74 rising from opposite side bars 75 of a return conveyor 76. As shown more clearly in Figures 1 and 6 each roller 73 has a sprocket wheel 77 on corresponding ends thereof that are traversed by a sprocket chain 78 and the drive for the rollers 73 includes a belt or chain 79 from the lower roller to the adjacent roller 80 of the return conveyor 76. It will be observed that the cakes X pass over the delivery and guide rollers 67 and 68 as illustrated in Figure 1 for engagement with the reversing rollers 73 and are moved by the latter in an arcuate path and placed in an upright position onto the return conveyor belt 76 as illustrated. As shown in Figure 1 the end of the conveyor 76 opposite the roller bearing 80 has a pivot roller bearing 81 so that the roller end 80 of the conveyor 76 may be raised or lowered with respect to the rollers 67 and 68 to accommodate cakes of different sizes and to accomplish such adjustment a lever system 82 is associated with the side frame bars 75 of the conveyor 76 and an adjacent upright leg 11 of the frame and includes an operating handle 83 having a latch moving over a segment 84. From the delivery conveyor 76 the iced cakes are passed onto the final delivery conveyor 85 that delivers the iced cakes in upright position at the cake-receiving end of the machine.

It will be understood that appropriate driving devices or other power means that form no part of the present invention are employed for the operation of the various conveying devices, and while there is herein shown and described the preferred embodiment of the invention, it is nevertheless to be understood that minor changes may be made therein without departing from the spirit and scope of the invention as claimed.

I claim:

1. In a machine for icing cakes, a supporting frame, a series of cake conveyors on the frame including a feed conveyor at one end thereof, a rotatable cake-icing drum at the end of the feed conveyor over which the cakes pass for the application of icing to the undersides thereof, a drying conveyor receiving the iced cakes, means at the end of the drying conveyor for inverting the cakes to dispose the iced sides upwardly, delivery conveyors for the iced cakes, an icing receptacle beneath the drying conveyor and into which the icing drum dips, removable end-bearing supports on the frame facilitating cleaning of the interior of the drum, one of said bearings having inlet and outlet steam flow passages therein for heating the drum, the inlet passage being in communication with the interior of the drum, and a pipe extending from the outlet passage to the other end of the drum and disposed substantially axially of the drum, the drying conveyor being pivotally mounted at one end and adapted to be swung upwardly to permit access to the icing receptacle.

2. In a machine for icing cakes, a supporting frame, a series of cake conveyors and manipulators on the frame including a feed conveyor at one end thereof, a rotatable cake-icing drum at one end of the feed conveyor over which the cakes pass for the application of icing to the undersides thereof, weighted means overlying the icing drum for holding the cakes in contact with the icing drum, a drying conveyor receiving the iced cakes, an icing receptacle beneath the drying conveyor and into which the icing drum dips, removable end bearing supports on the frame facilitating cleaning of the interior of the drum, one of said bearings having inlet and outlet steam flow passages therein for heating the drum, the inlet passage being in communication with the interior of the drum, and a pipe extending from the outlet passage to the other end of the drum and disposed substantially axially of the drum, the drying conveyor being pivotally mounted at one end and adapted to be swung upwardly to permit access to the icing receptacle.

3. In a machine for icing cakes, a supporting frame, a series of cake conveyors and manipulators on the frame including a feed conveyor at one end thereof, a rotatable cake-icing drum at the end of the feed conveyor over which the cakes pass for the application of icing to the undersides thereof, weighted means overlying the icing drum for holding the cakes in contact with the icing drum, means for regulating the thickness of icing on the drum for transmission to the cake being iced, a drying conveyor receiving the iced cakes, an icing receptacle beneath the drying conveyor and into which the icing drum dips, removable end bearing supports on the frame facilitating cleaning of the interior of the drum, one of said bearings having inlet and outlet steam flow passages therein for heating the drum, the inlet passage being in communication with the interior of the drum, and a pipe extending from the outlet passage to the other end of the drum and disposed substantially axially of the drum.

4. In a machine for icing cakes, a supporting frame, a series of cake conveyors and manipulators on the frame including a feed conveyor at one end thereof, a rotatable cake-icing drum at the tail end of the feed conveyor over which the cakes pass for the application of icing to the undersides thereof, a drying conveyor receiving the iced cakes, means at the end of the drying conveyor for inverting the cakes to dispose the iced sides upwardly, delivery conveyors for the iced cakes, the means for inverting the iced cakes including an arcuate stand of driven rollers extending horizontally across the delivery end of the drying conveyor, and means interposed between the drying conveyor and rollers for directing the cakes onto the rollers, said stand of rollers being mounted on the cake-receiving end of the delivery conveyor and said delivery conveyor being pivotally supported at its far end whereby the stand of rollers may be adjusted relative to the delivery end of the drying conveyor for adapting the machine to the handling of cakes of different sizes.

5. In a machine for icing cakes, a supporting frame, a series of cake conveyors and manipulators on the frame including a feed conveyor at one end thereof, a rotatable cake-icing drum at the tail end of the feed conveyor over which the cakes pass for the application of icing to the undersides thereof, a drying conveyor receiving the iced cakes, means at the end of the drying conveyor for inverting the cakes to dispose the iced sides upwardly, and delivery conveyors for the iced cakes, the means for inverting the iced cakes including an arcuate stand of driven rollers extending horizontally across the delivery end of the drying conveyor, said stand of rollers being mounted on the cake receiving end of the adjacent delivery conveyor and said last named conveyor being pivotally supported at its far end whereby the stand of rollers may be adjusted relative to the delivery end of the drying conveyor for adapting the machine to the handling of cakes of different sizes.

6. In a machine for icing cakes, a supporting frame, a series of cake conveyors and manipulators on the frame including a feed conveyor at one end thereof, a rotatable cake-icing drum at the tail end of the feed conveyor over which the cakes pass for the application of icing to the undersides thereof, a drying conveyor receiving the iced cakes, means at the tail end of the drying conveyor for inverting the cakes to dispose the iced sides upwardly, and a delivery conveyor for the iced cakes, the means for inverting the iced cakes including an arcuate stand of rollers extending horizontally across the delivery end of the drying conveyor.

7. Structure according to claim 6 in which the cake-receiving end of the delivery conveyor is adjustable vertically in relation to the point of discharge of the cakes from the drying conveyor.

8. In a machine for icing cakes, a supporting frame, a series of cake conveyors on the frame including a feed conveyor at one end and a drying conveyor at the other end thereof, a rotatable cake-icing drum for the application of icing to the undersides thereof and over which the cakes pass in course of their conveyed travel, an icing receptacle beneath the drying conveyor and into which the icing drum dips, removable end-bearing supports on the frame facilitating cleaning of the interior of the drum, one of said bearings having inlet and outlet steam-flow passages therein for heating the drum, the inlet passage being in communication with the interior of the drum, and a pipe extending from the outlet passage to the other end of the drum and disposed substantially axially of the drum.

9. In a machine for icing cakes, a supporting frame, a series of cake conveyors on the frame including a feed conveyor at one end and a drying conveyor at the other end thereof, a rotatable cake-icing drum for the application of icing to the undersides thereof and over which the cakes pass in course of their conveyed travel, weighted means overlying the icing drum for holding the cakes in contact with the icing drum, an icing receptacle beneath the drying conveyor and into which the icing drum dips, removable end-bearing supports on the frame facilitating cleaning of the interior of the drum, one of said bearings having inlet and outlet steam-flow passages therein for heating the drum, the inlet passage being in communication with the interior of the drum, and a pipe extending from the outlet passage to the other end of the drum and disposed substantially axially of the drum.

LECONIE STILES.

REFERENCES CITED

The following references are of record in the file of this patent:

UNITED STATES PATENTS

| Number | Name | Date |
|---|---|---|
| 1,043,021 | Mayer | Oct. 29, 1912 |
| 1,450,571 | Allen | Apr. 3, 1923 |
| 1,476,988 | Latta | Dec. 11, 1923 |
| 1,865,890 | Drake | July 5, 1932 |
| 2,260,686 | Segrin | Oct. 28, 1941 |
| 2,348,800 | Fredrickson | May 16, 1944 |
| 2,413,979 | Lamb | Jan. 7, 1947 |
| 2,421,801 | Miller | June 10, 1947 |